June 8, 1926.

E. W. WILKINSON ET AL 1,588,077

FLOTATION MACHINE

Filed Oct. 22, 1920 4 Sheets-Sheet 1

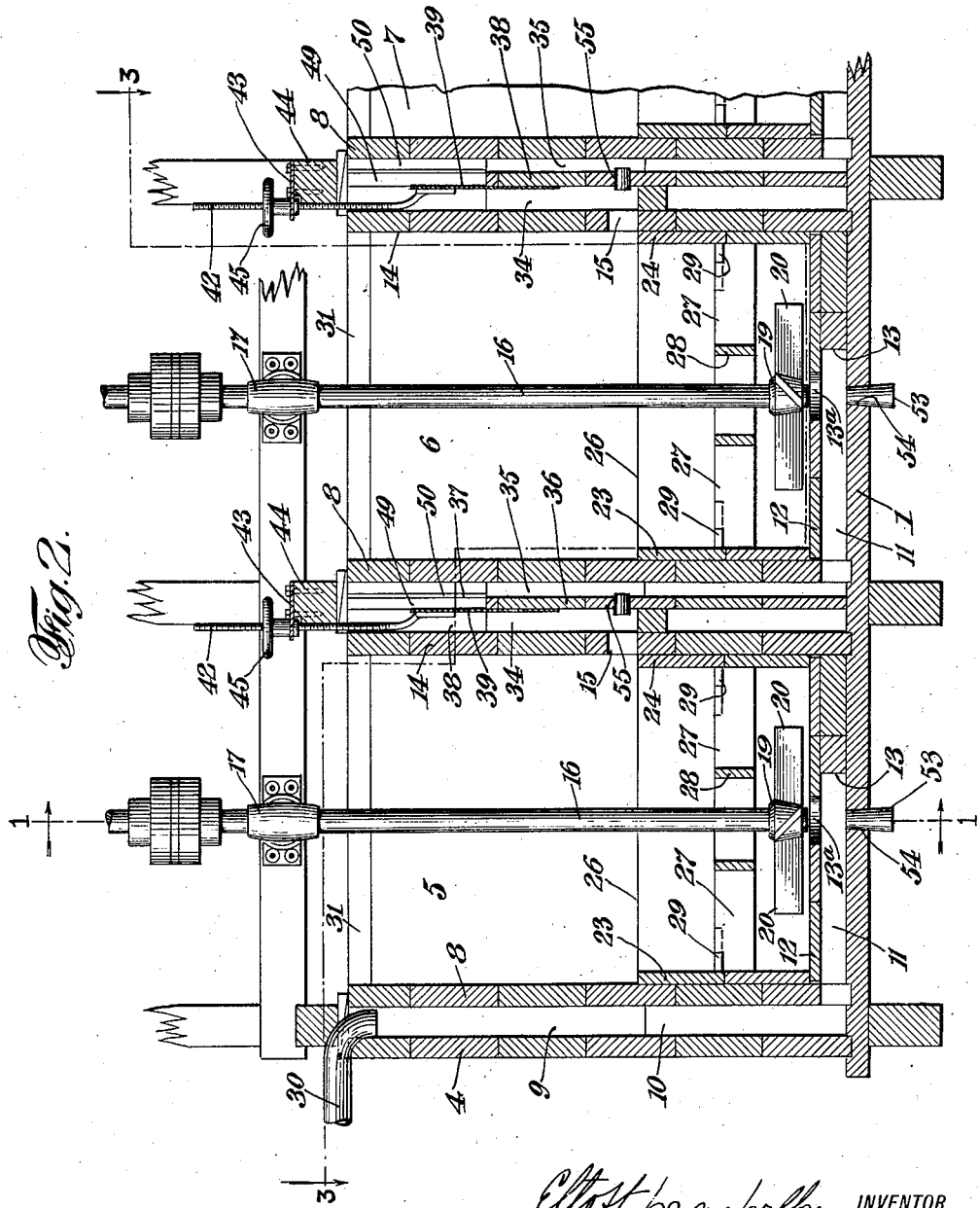

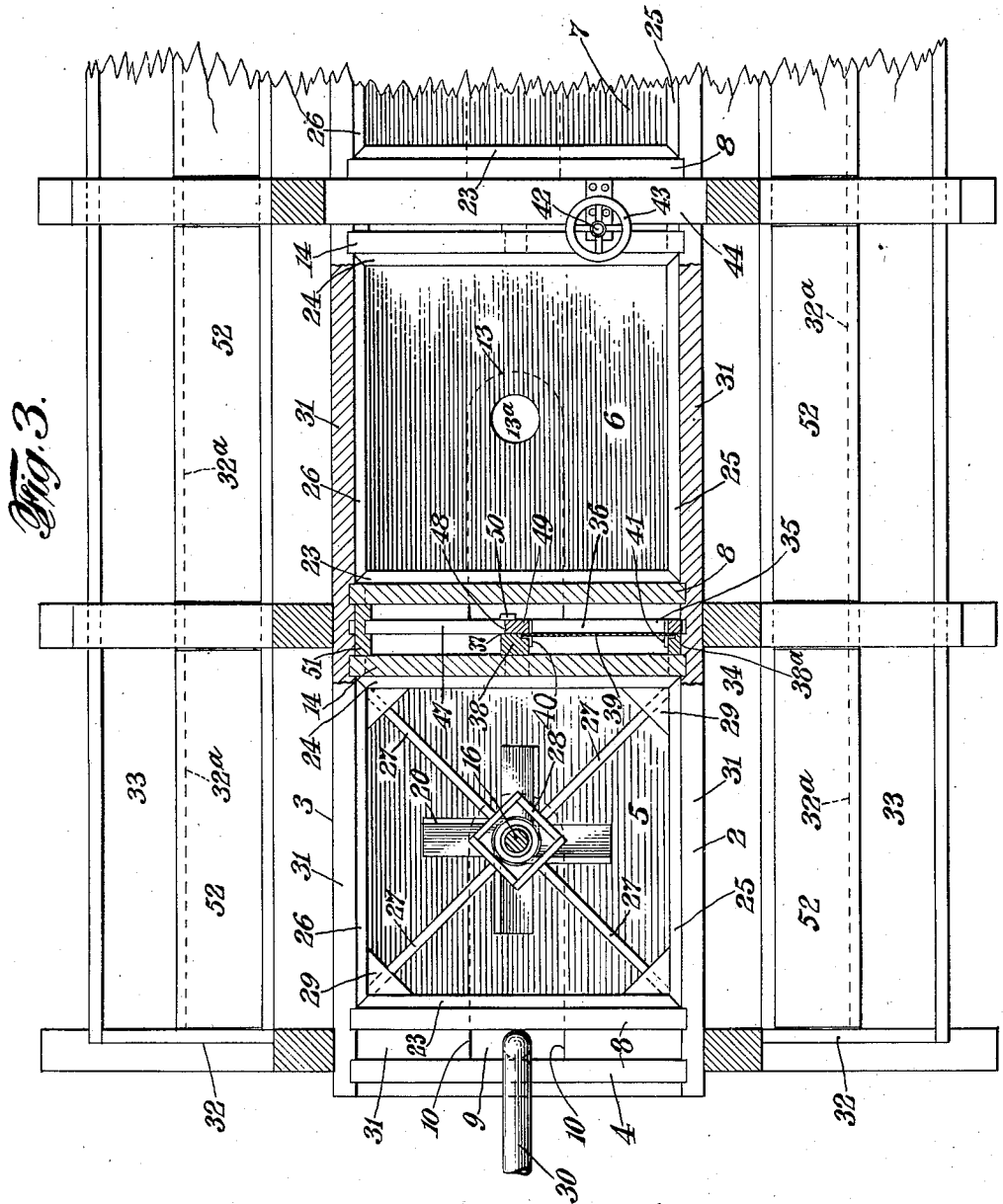

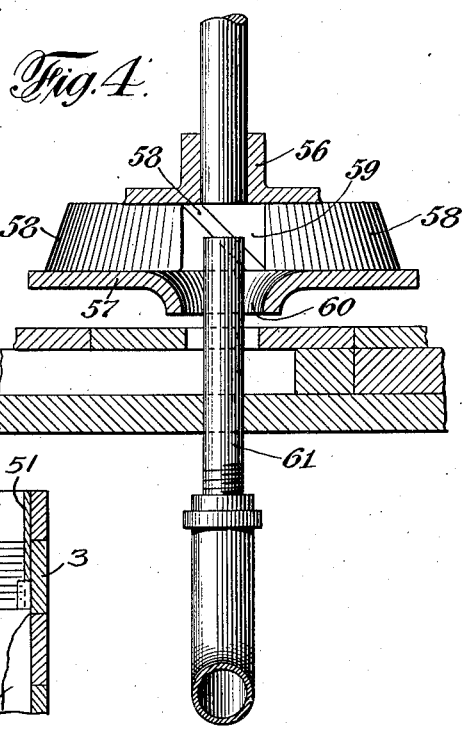
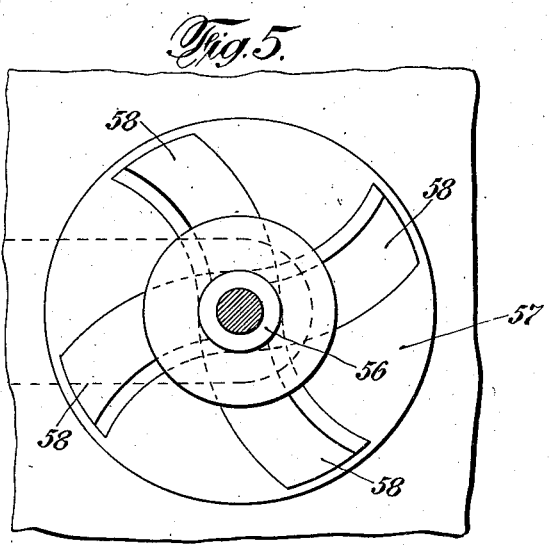

Patented June 8, 1926.

1,588,077

UNITED STATES PATENT OFFICE.

ELTOFT WRAY WILKINSON, OF SAN FRANCISCO, AND JOHN W. LITTLEFORD, OF ALAMEDA, CALIFORNIA, ASSIGNORS TO MINERALS SEPARATION NORTH AMERICAN CORPORATION, OF NEW YORK, N. Y., A CORPORATION OF MARYLAND.

FLOTATION MACHINE.

Application filed October 22, 1920. Serial No. 418,707.

This invention relates to improvements in apparatus for the concentration of ores or other materials and is herein disclosed as applied to the froth-flotation separation process. In this process the materials to be separated are subjected to aeration in a liquid medium in the presence of a frothing agent for the formation of a froth. Such a process is described in some detail in the prior patents No. 835,120 of November 6, 1906, No. 962,678 of June 28, 1910, and No. 1,064,723 of June 17, 1913.

The invention may be employed for general or collective froth-flotation separation and lends itself particularly to selective separation or differential froth-flotation.

The apparatus embodying this invention may be employed in the treatment of a large variety of materials to effect a separation of certain components of said materials from other components thereof. Such materials include minerals, ores, coal, slimes, trade wastes, water, sewage, wool grease, starch-glucose mixtures, etc., and concentrates, middlings and tailings of former treatments of such materials.

The flotation apparatus herein disclosed by way of example comprises a series of combined pulp-agitating and froth-separating cells or units located upon the same horizontal level, each unit being provided with a rotary propeller or pumping impeller serving to agitate the pulp, and also serving to effect a continuous positive flow of pulp through the apparatus.

The units are shown as having intervened vertical passages formed by the intermediate walls separating adjacent units, each passage comprising an up-flow conduit and a down-flow conduit, each of said passages being provided with a weir and being open to the atmosphere at the top for the introduction of air. Instead of introducing air through the open top of a passage, any gas other than air, mixtures of gas and air, reagents in the form of vapor, or "smoke" and air may be introduced. In this case however, the top of the passage would be closed to the atmosphere. The tailings residue from one unit may enter the first or "up-flow" conduit leading to the next succeeding unit, and cascade over the weir into the second or "down-flow" conduit. Air entering through the open top of the passage may be entrained in the down-flowing pulp and the combined stream of pulp, air, etc., is then guided beneath the impeller of the next succeeding unit, together with any reagents which may have been added through the open top of the passage. This impeller sucks the stream up into its unit for subjecting it to further agitation and permitting froth separation therein.

There is a practically unobstructed upward movement of the air bubbles from the zone of agitation to the froth layer and the bubbles laden with mineral are permitted to rise undiverted by any side current compelling means such, for example, as side currents of inflowing pulp or side movement-compelling guides or baffles, so that the mineral laden bubbles from the zone of agitation may rise freely, unobstructedly, and quietly, carrying their load of mineral up into the superincumbent froth layer. This is associated with a positive feed of pulp from unit to unit in a series of individual units or vessels in each of which the pulp is agitated, fine air bubbles are distributed through it, and the air bubbles are permitted to rise freely, unobstructedly, and quietly into an overflowing froth layer.

Among the objects of the invention are increased efficiency, simplicity, economy and reliability. Other objects and advantages will hereinafter appear.

In the accompanying drawings is shown one form of apparatus embodying our invention:

Figure 2 is a longitudinal sectional view taken on the line 2—2 of Figure 1, parts being broken away.

Figure 3 is a top view partly in section taken on the line 3—3 of Figure 2.

Figure 4 is a sectional view of an alternative form of impeller and adjacent parts.

Figure 5 is a plan view of the same.

Figure 6 is a detail view showing the weir slat structure.

Figure 1:
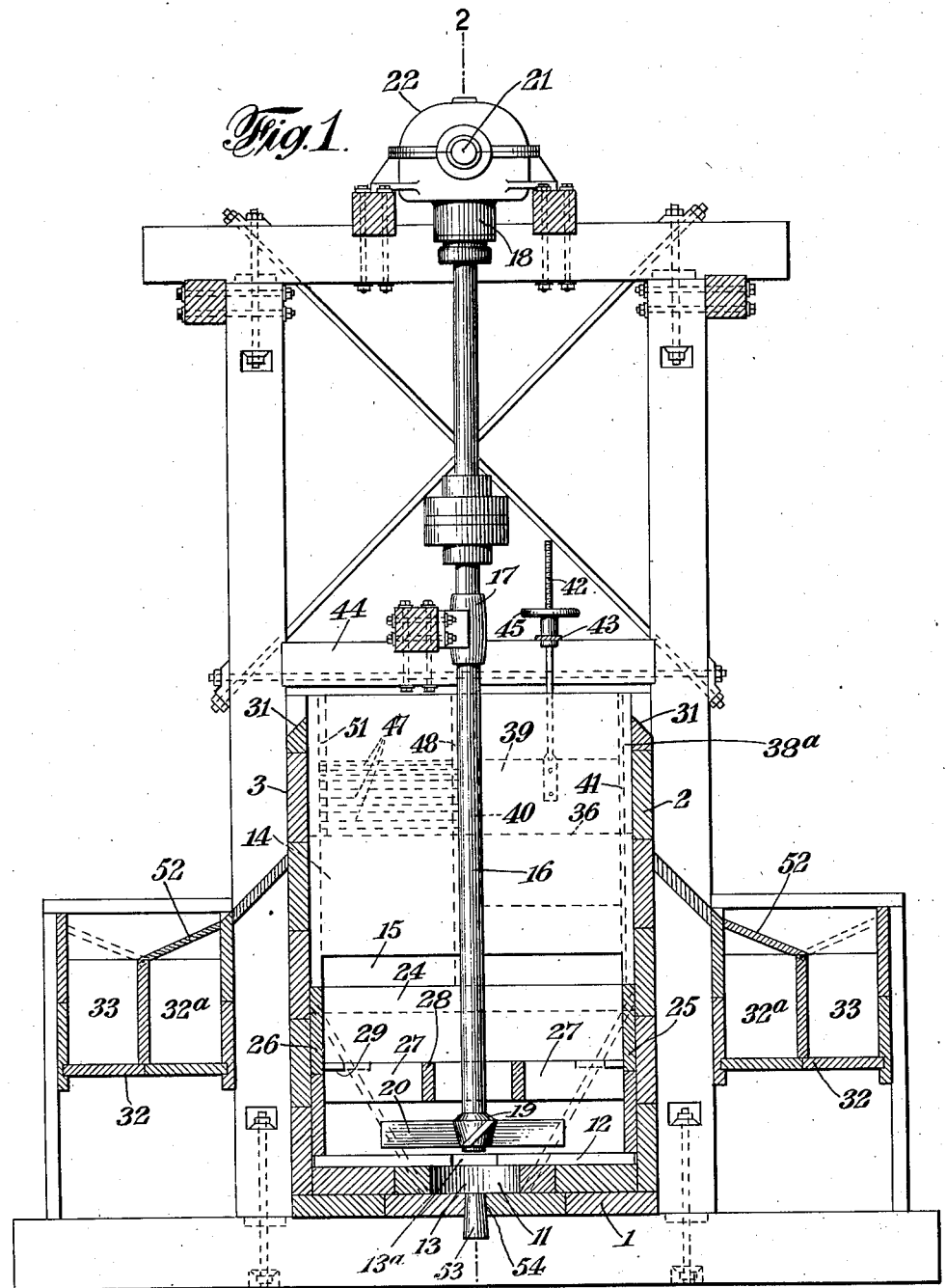
Figure 1 is a transverse sectional view through the apparatus taken on the line 1—1 of Figure 2.

The apparatus shown comprises a rectangular trough or box having a horizontal bottom portion 1, two side walls, 2 and 3, and two end walls 4 (only one of which is shown herein), said vessel being divided into a series of connected pulp-agitating and froth-separating cells or units, 5, 6 and 7. Any convenient number of units, 5, 6 and 7, may be arranged in series, but for convenience of description only two complete units and a portion of a third have been illustrated.

At the feed end of the apparatus, the left hand as viewed in Figure 2, a vertical wall 8 is provided, which with the end wall 4 forms a vertical feed conduit 9 extending to the bottom of the apparatus. Converging members 10, which incline downwardly, constrict the bottom of the feed conduit 9 to form a funnel-shaped channel and guide the prepared pulp mixture into the narrow intake conduit or passage 11 extending under the bottom member 12 of the first cell or unit 5. The intake conduit 11 terminates at its inner end in a semi-circle 13 concentric with the axis of the impeller to be hereinafter described. The conduits 9 and 11 form a feed passage open to the air at the top down which the pulp is cascaded and through which it is drawn by the impeller of the first unit to be hereafter described.

Each unit 5, 6 and 7 above referred to includes a transverse wall 8, a bottom member 12 having a centrally located inlet 13$^a$, a transverse wall 14 having a horizontally elongated rectangular outlet 15, and side walls 2 and 3. In each of said units there is provided a rotating vertical spindle 16 suitably supported in overhead bearings 17 and 18 and carrying at its lower end a rotary impeller 19 having a suitable number of inclined blades 20, four in this instance. Instead of employing inclined impeller blades, any other suitable type may be used. The axis of the impeller 19 is located directly above the circular opening 13$^a$ in the bottom 12 of the unit, said opening being concentric with the semi-circle 13, but considerably smaller. The spindles 16 may be driven in any suitable manner, as by a shaft 21 connected thereto by suitable gearing (not shown) in the housing 22. Other types of impellers may also be used instead of the ordinary cross-arm agitator shown in Figures 1 to 3.

Figures 4 and 5 show a second form of impeller comprising an upper disc 56 and a lower disc 57 and between them inclined webs or blades 58 extending out to the full diameter of the lower disc and beyond the outer diameter of the upper disc so that parts of their edges are exposed. These webs or blades 58 terminate at their inner ends at a substantial distance from the axis of the impeller, leaving a central chamber 59. The lower disc 57 has an opening 60 up which the pulp may flow into the central chamber for distribution between the webs or blades. As shown, an air pipe 61 extends up into the chamber 59 so as to discharge air therein, but this pipe may be omitted if sufficient air is otherwise supplied.

The outlet 15 may be made sufficiently small to cause the tailings to flow therethrough at a velocity high enough to prevent clogging up of the passages of the apparatus due to settling of large or heavy particles.

For preventing the walls of the cells in the zone of greatest agitation from wearing out, due to the abrasive action of the pulp, lining members or liners, 23, 24, 25 and 26, may be employed, preferably extending from the cell bottom to a point just below the outlet 15. These liners and also the cell bottom may be made of any suitable wear resistant material, such as cast-iron or hardwood.

Any suitable baffling means for quieting the motion of the pulp may be interposed between the impeller blades 20 and the outlet 15. The baffle herein disclosed, which may also be made of cast-iron, comprises four diagonally arranged vertical cross-pieces 27, radiating from an inner square boxing 28 surrounding and spaced from the spindle 16. Each of the cross-pieces 27 has upon its outer end a triangular anchor member 29; and the cross-pieces and the triangular members are attached by screws, or the like, to the lining at the corners of the cells.

The feed or material to be treated in the apparatus may first be prepared in a preliminary mixer, as, for instance, a chamber (not shown) similar to the units 5, 6, 7, having an agitating impeller, but in which there is no baffle or froth overflow, or, if desired, when operating on ore pulps, the mixing may take place in a preliminary grinder such as a ball mill. Water, suitable flotation agents, flocculating or deflocculating agents, selectively-modifying agents, and other modifiers or chemicals, together with air, may be commingled with the raw material in this preliminary mixing operation. Any or all of such materials may be added to the open conduit leading to any cell of the series. The material or pulp thus prepared may then be fed through the feed pipe 30 into the vertical feed conduit 9, from which it flows into the horizontal intake conduit 11 leading to the center of the first cell or unit 5 from which it is drawn up into that cell or unit by the pumping action of the inclined blades 20 of the rotary impeller 19 located therein. The impeller blades thoroughly agitate the pulp-and-air stream delivered thereto, forming bubbles and causing the stream to rise with a rapid swirling motion. The rising swirling stream of bubbles and pulp is quieted by the baffle, and the concentrate-carrying bubbles flow upwardly to the surface of the pulp, where the froth passes over the lips 31 into the common double launder 32 having troughs 32ª and 33. The tailings from each unit of the series except the last are discharged through the outlet 15 into the vertical passage leading to the next succeeding unit.

The vertical passages connecting the adjacent units of the apparatus are each divided into two portions by a dividing wall including a partition 36, thus forming an upflow conduit 34 and a downflow conduit 35.

The upflow conduit 34 extends from the outlet 15 to the top of said dividing wall, while the downflow conduit 35 extends from the top of said wall to the bottom of the intake conduit 11 leading into the next cell. The dividing wall of said passage comprises a short lower vertical partition 36 above which is located a central guiding and spacing member 37 separating the two adjustable weirs 39 and 47 located on either side thereof. A vertical partition 38 divides the upflow passage into two parts so that the pulp enters the downflow passage in two streams, one from each of the weirs. The weir adjacent the wall 2 of the cell comprises a sheet metal plate 39, preferably of cast iron, sliding in grooves 40 and 41 formed in the dividing member 38, and the guide 38ª, respectively. The metal plate 39 is provided with an upwardly extending adjusting rod 42 threaded at its upper end and passing through an opening in the metal supporting plate 43 mounted upon the cross beam 44, where it is engaged and may be raised or lowered by the threaded hand-wheel 45. To prevent leakage of pulp around the edges of said metal weir or gate, suitable rubber strips may be located in said grooves 40 and 41.

The weir or gate adjacent the wall 3 of the cell consists of a series of superposed removable slats 47, said slats extending into the guideway 48 formed by the member 38, and the upright members 49 and 50 and also extending into the opposing rabbeted rectangular groove in the guide 51.

The addition or removal of these slats gives a rough adjustment of the height of one half of the weir, while the adjustment of the plates 39 gives a fine adjustment of the other half of the weir. By this means an excellent control of the pulp level may be readily maintained even though the feed may vary considerably both in quantity and quality.

In operation, after the pulp has been agitated and aerated in the first unit 5, the tailings residue passes through the horizontal outlet slot 15 into the vertical upflow conduit 34, and cascades over both of the level controlling weirs 39 and 47, and plunges into the downflow conduit 35, from which it flows into the intake passage 11 of the unit 6.

The action of the pulp in the downflow conduit 35 is precisely similar to its action in the feed conduit 9, already described. Thus the cascading pulp stream entrains air which enters through the open top of the conduit and together with any supplemental flotation or other agents which may be added at this time, falls and splashes through the funnel-shaped channel formed by the inclined portions 10 of said downflow conduit and surges through the horizontal conduit 11 and is drawn up into the agitation zone of the next cell 5 by the pumping action of the impeller located therein.

In order to introduce the proper amount of air to efficiently aerate the pulp, the factors controlling the operation may be so adjusted that the impellers tend to draw in pulp faster than it is being supplied through the conduits, so that the downflow conduits are not allowed to flow "full," but "free" air is sucked in with the streams of pulp.

The double-passages with the adjustable weirs therein connecting the cells thus serve not only to control the level of the pulp in the cells and to permit the addition of flotation and other agents into each cell, but the conduits also make possible the automatic introduction of air into each individual cell for aerating the pulp, without the necessity for employing the expensive air compressors common in previous flotation apparatus.

The froth, after flowing over the lips 31 may all be combined into a single stream and collected in either one of the troughs 32ª or 33 of the common double launder 32.

It may be found desirable in some cases to separate the froth of the first cells from the froth of the last cells of the series, so that the latter may be returned to the circuit for further concentration. To effect such a separation, hinged aprons 52, which may be pivoted to the central wall of the common launder 32, may be swung outwardly from the positions shown in full lines on Figure 1 to the positions indicated by dotted lines. This permits concentrates to be drawn off through the trough 32ª while the middlings from the last cells are combined in the trough 32 and returned to the circuit at any desired point.

As will be noted, this apparatus effects a positive delivery of all of the tailings residue from each unit through the open conduit into the next succeeding unit. This insures that all the tailings flowing from each unit are reagitated and reaerated in the next unit of the series, even when all the units are located on the same horizontal level. Each cell of the series thus comprises a combined agitating and separating vessel having means for automatically sucking in air from the atmosphere, thus usually making unnecessary the use of spitzkastens or air compressors.

The proportions and nature of agents employed, the pulp density, the peripheral speed of impellers, the speed of pulp flow, the froth depth, the froth discharge area, and other factors will vary greatly with different ores and other materials to be treated. Before utilizing this apparatus for the concentration of any particular ore or other material, therefore, a simple preliminary test may be necessary to determine the conditions which will yield the character and proportions of froth and tailings desired.

It is found that froth paddles are usually unnecessary to secure sufficiently rapid removal of the froth from the surface of the pulp.

If it is desired, when treating some materials, to introduce an additional amount of air to one or more of the cells, a plug 53, preferably of wood, may be removed from an opening 54 in the bottom of the apparatus, and an air pipe inserted. Such an air pipe is shown in Figure 4, combined with an alternative form of impeller.

When operating on pulps carrying heavy sands or large particles, it may be desirable in some instances to provide a by-pass such as the orifice 55 in the partition 36, to allow a portion of the pulp containing the heavy or large particles of said pulp to flow directly from the upflow conduit to the downflow conduit, thus avoiding the necessity of carrying said particles over the weir and also preventing any obstruction due to settling in the upflow conduit. This orifice 55 may be conveniently located opposite the rectangular outlet 15. Ordinarily, however, this orifice will be closed by the plug, as shown.

The general principles of the invention embodied in the foregoing specific apparatus may be applied in other forms of apparatus by the exercise of the technical skill of the art and still other adaptations may be inventively devised, all within the scope of the following claims:

We claim:

1. In a froth-flotation separation apparatus a combined agitating, gasifying and froth-separating chamber, an inlet passage provided with means for cascading the pulp therein and having an inlet entering the chamber in the bottom wall of the chamber, a baffle in the chamber, an agitator at the lower part of the chamber above the inlet and below the baffle and arranged to exert suction on the pulp to draw the pulp upwardly through the inlet and force the pulp upwardly past the baffle through the chamber, the chamber being unobstructed except for the baffle therein above the agitator so that the bubbles may rise directly upward from the zone of agitation to an overflowing froth layer above the pulp, and an outlet for the pulp leading out from the chamber at a substantial distance below the pulp level therein.

2. An apparatus for froth-flotation separation comprising a plurality of units, each of which units is both a pulp-agitating and a froth-separating chamber provided with a pulp inlet and a tailings outlet, the pulp inlet in each unit entering the bottom wall of the chamber and the tailings outlet in each unit being a substantial distance below the pulp level in the chamber, the tailings outlet and the pulp inlet of units in series being connected by a passage provided with a weir overflow for controlling the level of the pulp in the preceding unit and with means for cascading the pulp therein and flowing the same substantially horizontally to the pulp inlet of the next unit in series, each of which chambers is provided with a baffle and with an agitator at the lower part of the chamber above the inlet and below the baffle and arranged to exert suction on the pulp to draw the pulp upwardly through the inlet and force the pulp upwardly past the baffle and through the chamber, the chamber being unobstructed except for the baffle therein above the agitator so that the bubbles may rise upwardly from the zone of agitation to an overflowing froth layer above the pulp.

3. An apparatus for froth-flotation separation comprising a plurality of units, each of which units is both a pulp-agitating and a froth-separating chamber and is provided with a pulp inlet and a tailings outlet, the tailings outlet and pulp inlet of each two adjacent units being connected by a passage provided with an adjustable weir overflow for controlling the level of the pulp in the preceding unit, and each of which units is provided with an agitator at the lower part of the chamber above the inlet, and a baffle above the agitator for directing the pulp upward from the zone of agitation, said chamber being unobstructed except for the baffle above the agitator so that the bubbles may rise directly upward from the zone of agitation to an overflowing froth layer above the pulp.

4. An apparatus for froth-flotation separation comprising a plurality of units, each of which units is both a pulp-agitating and a froth-separating chamber and is provided with a pulp inlet and a tailings outlet, the tailings outlet and pulp inlet of each two adjacent units being connected by a passage of such width as to provide a gas space above the pulp therein, and each of which units is provided with an agitator at the lower part of the chamber above the inlet adapted to act as a pump to draw pulp up into the chamber, and a baffle above the agitator for directing the pulp upward from the zone of agitation, said chamber being unobstructed except for the baffle above the agitator so that the bubbles may rise directly upward from the zone of agitation to an overflowing froth layer above the pulp.

5. An apparatus for froth-flotation separation comprising a unitary pulp-agitating and froth-separating chamber, means for admitting gas and pulp to the bottom of the chamber, an agitator in the chamber capable of drawing in air and pulp through said means against substantially the head of pulp in the chamber a baffle above the agitator for directing the pulp upward from the zone of agitation, a froth-separating lip, a pulp exit of considerable width below the froth level, and a conduit leading upward from the exit and having means therein for controlling the level of the pulp in the chamber.

6. An apparatus for froth-flotation separation comprising a unitary pulp-agitating and froth-separating chamber, means for admitting gas and pulp to the bottom of the chamber, an agitator in the chamber capable of drawing in air and pulp against substantially the head of pulp in the chamber, a baffle above the agitator for directing the pulp upward from the zone of agitation, a froth-separating lip, a pulp exit of considerable width below the froth level, and a conduit leading upward from the exit and having a weir overflow for controlling the level of the pulp in the chamber.

7. An apparatus for froth-flotation separation comprising a unitary pulp-agitating and froth-separating chamber, an agitator in the chamber, means for admitting gas and pulp to the bottom of the chamber, an agitator in the chamber capable of drawing in air and pulp against substantially the head of pulp in the chamber, a baffle above the agitator for directing the pulp upward from the zone of agitation, a froth-separating lip, a pulp exit of considerable width below the froth level, and a conduit leading upward from the exit and having an adjustable weir overflow for controlling the level of the pulp in the chamber.

8. An apparatus for froth-flotation separation comprising a unitary pulp-agitating and froth-separating chamber, a suction agitator in the chamber, means for admitting gas and pulp to the chamber beneath the agitator, a froth-separating lip, a pulp exit below the froth level, a conduit leading from the exit, a weir overflow from said conduit, a second froth-separating chamber, and a conduit for conveying the tailings of the first chamber to the second chamber extending from the weir overflow of the first chamber and having a drop therein adapted to cause the entrainment of gas in the tailings.

9. An apparatus for froth-flotation separation comprising a unitary pulp-agitating and froth-separating chamber, an agitator in the chamber, means for admitting gas and pulp to the chamber, a froth-separating lip, a pulp exit below the froth level, a conduit leading from the exit, a weir overflow from said conduit, a second pulp-agitating and froth-separating chamber, a conduit for conveying the tailings of the first chamber beneath the second chamber extending from the weir overflow of the first chamber and having a drop therein adapted to cause the entrainment of gas in the tailings, and an agitator in the second chamber adapted to pump the tailings upwardly from said tailings conduit into the second chamber.

10. An apparatus for froth-flotation separation comprising a unitary pulp-agitating and froth-separating chamber, an agitator in the chamber, means for admitting gas and pulp to the chamber, a froth-separating lip, a pulp exit below the froth level, a conduit leading from the exit, a weir overflow from said conduit, a second pulp-agitating and froth-separating chamber, a conduit for conveying the tailings of the first chamber to the second chamber extending from the weir overflow of the first chamber and having means for entry of air therein and of such width as to provide a gas space above the pulp, and an agitator in the second chamber adapted to pump the tailings from said tailings conduit, together with additional gas from said gas space, into the second chamber.

11. An apparatus for froth-flotation separation comprising a unitary pulp-agitating and froth-separating chamber, an agitator in the chamber, means for admitting gas and pulp to the chamber, a froth-separating lip, a pulp exit below the froth level, a conduit leading from the exit, a weir overflow from said conduit, a second pulp-agitating and froth-separating chamber, a conduit for conveying the tailings of the first chamber to the second chamber extending from the weir overflow of the first chamber, and having means for entry of gas therein, and having a drop therein adapted to cause the entrainment of gas, and of such width as to provide a gas space above the pulp, and an agitator in the second chamber adapted to pump the tailings from said tailings conduit, together with additional gas from said gas space, into the second chamber.

12. An apparatus for froth-flotation separation comprising a unitary pulp-agitating and froth-separating chamber, means for admitting gas and pulp to the chamber, a froth-separating lip, a pulp exit below the froth level, a conduit leading from the exit, and a weir overflow from said conduit comprising integral pieces removable for adjusting the height of the weir and also comprising a weir gate adjustable up and down to finely adjust the level of the pulp in the chamber.

13. In an apparatus for froth-flotation separation, a series of unitary vessels in which the material is agitated and aerated and the froth is separated, a passage connecting the outlet of one of said vessels with the inlet of another, said passage having vertical walls and including a fixed interior partition dividing said passage into an upflow conduit and a downflow conduit; an outlet leading into said upflow conduit, an inlet leading from the bottom of said downflow conduit, and an adjustable weir above said partition, said weir comprising two sections, one of said sections including a series of removable slats resting upon said partition and the other section including a gate supported in sliding contact with said partition, and means to adjustably support said gate.

In testimony whereof, we have affixed our signatures to this specification.

ELTOFT WRAY WILKINSON.
JOHN W. LITTLEFORD.